US008513613B2

(12) United States Patent
Herrmann et al.

(10) Patent No.: US 8,513,613 B2
(45) Date of Patent: Aug. 20, 2013

(54) RADIATION DETECTOR WITH SEVERAL CONVERSION LAYERS

(75) Inventors: Christoph Herrmann, Aachen (DE); Christian Baeumer, Hergenrath (BE); Roger Steadman Booker, Aachen (DE); Guenter Zeitler, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 734 days.

(21) Appl. No.: 12/675,798

(22) PCT Filed: Sep. 5, 2008

(86) PCT No.: PCT/IB2008/053602

§ 371 (c)(1), (2), (4) Date: Mar. 1, 2010

(87) PCT Pub. No.: WO2009/031126

PCT Pub. Date: Mar. 12, 2009

(65) Prior Publication Data

US 2010/0213381 A1 Aug. 26, 2010

(30) Foreign Application Priority Data

Sep. 7, 2007 (EP) .................................... 07115967

(51) Int. Cl.
*H01L 27/146* (2006.01)
*G01T 1/20* (2006.01)

(52) U.S. Cl.
USPC ................................ 250/370.09; 250/370.11

(58) Field of Classification Search
USPC ....................................... 250/370.09, 370.11
See application file for complete search history.

(56) References Cited

U.S. PATENT DOCUMENTS

| | | | | |
|---|---|---|---|---|
| 4,857,737 | A | 8/1989 | Kamae et al. | |
| 5,434,417 | A | 7/1995 | Nygren | |
| 6,285,029 | B1 | 9/2001 | Shahar et al. | |
| 7,022,996 | B2 | 4/2006 | Matoba et al. | |
| 7,479,639 | B1 * | 1/2009 | Shahar et al. | 250/370.06 |
| 7,606,347 | B2 | 10/2009 | Tkaczyk et al. | |
| 2003/0006376 | A1 | 1/2003 | Tumer | |
| 2008/0240339 | A1 | 10/2008 | Du et al. | |

FOREIGN PATENT DOCUMENTS

| | | | |
|---|---|---|---|
| WO | 2005060011 | A1 | 6/2005 |
| WO | 2008018534 | A1 | 2/2008 |

OTHER PUBLICATIONS

Kippen et al: "Cosmic: A Multi-Scatter Compton Telescope Sky-Monitor for Low-Energy Gamma-Ray Astronomy"; IEEE Nuclear Science Symposium, vol. 1, 1997, pp. 320-324.

* cited by examiner

*Primary Examiner* — Constantine Hannaher
*Assistant Examiner* — Mindy Vu

(57) ABSTRACT

The invention relates to a radiation detector (100), particularly for X-rays (X) and for γ-rays, which comprises a combination of (a) at least one primary conversion layer (101*a*-101*f*) with a low attenuation coefficient for the photons and (b) at least one secondary conversion layer (102) with a high attenuation coefficient for the photons. In preferred embodiments, the primary conversion layer (101*a*-101*f*) may be realized by a silicon layer coupled to associated energy-resolving counting electronics (111*a*-111*f*, 121). The secondary conversion layer (102) may be realized for example by CZT or GOS coupled to energy-resolving counting electronics or integrating electronics. Using primary conversion layers with low stopping power allows to build a stacked radiation detector (100) for spectral CT in which the counting rates of the layers are limited to feasible values without requiring unrealistic thin layers.

17 Claims, 2 Drawing Sheets

RADIATION DETECTOR WITH SEVERAL CONVERSION LAYERS

FIELD OF THE INVENTION

The invention relates to a radiation detector comprising at least two conversion layers for the conversion of incident photons into electrical signals. Moreover, it relates to an X-ray detector and an imaging system comprising such a radiation detector.

BACKGROUND OF THE INVENTION

The U.S. Pat. No. 7,022,996 B2 discloses a radiation detector that comprises a combination of a silicon (Si) and a CdZnTe (CZT) or CdTe conversion layer. With this configuration, low energy radiation is absorbed by the Si layer having superior resolution, while high-energy radiation is absorbed by the other layer having a high detection efficiency with respect to high energy radiation. This radiation detector is particularly suited for the detection of γ radiation with high energy resolution in the range of tens of eV.

Based on this situation it was an object of the present invention to provide alternative means for detecting radiation, particularly X- and γ-radiation, wherein it is desirable that these means can be applied in spectrally resolving imaging systems.

This object is achieved by a radiation detector according to claim 1, an X-ray detector according to claim 16, and an imaging system according to claim 17. Preferred embodiments are disclosed in the dependent claims.

SUMMARY OF THE INVENTION

A radiation detector according to the present invention may serve for the quantitative and/or qualitative detection of electromagnetic radiation, particularly X-radiation or γ-radiation, which propagates in the average along a given direction that will in the following be called "main radiation direction". The radiation detector comprises the following components:

a) At least one conversion layer, which is called "primary conversion layer" in the following for purposes of reference and which has a low attenuation coefficient for the photons that shall be detected. Together with the primary conversion layer, an energy-resolving counting electronics (abbreviated "ERCE" in the following) is provided that serves for counting electrical pulses generated in the primary conversion layer upon conversion of incident photons and for classifying these pulses (e.g. into a given number of categories) according to the energies of the converted photons.

As usual, the "attenuation coefficient" shall express the intrinsic attenuation capability of a material (irrespective of its geometry). Thus the intensity of a radiation beam will drop by the factor exp(-μx) after passing through a material with attenuation coefficient μ and thickness x. Moreover, it should be noted that the attenuation coefficient will typically depend on the energy E of the incident radiation, i.e. the most complete representation of the attenuation coefficient corresponds to a spectrum of values μ(E); approximate single values can be obtained from this e.g. by averaging of the spectrum.

The primary conversion layer will usually have a simple geometrical form, particularly that of a cuboid or a more or less flat sheet, and it will typically consist of a homogeneous (pure or composite) material. Incident photons will usually create free electrical charges (e.g. electron-hole pairs) in the primary conversion layer, which can be detected as electrical (voltage- or charge-) pulses with an applied electrical field and associated electrodes that are coupled to the ERCE.

b) At least one further conversion layer, which will be called "secondary conversion layer" in the following for purposes of reference, and which is provided together with an associated readout electronics for electrical signals generated in the secondary conversion layer upon conversion of incident photons. The secondary conversion layer and/or the associated readout electronics may optionally be identical or similar in design to the primary conversion layer and the ERCE, respectively. However, preferred embodiments of the invention will be described below in which the primary and secondary conversion layers are different from each other.

By using a primary conversion layer with a low attenuation coefficient, i.e. stopping power for incident photons, the described radiation detector is suited for applications in which high counting rates of incident photons have to be dealt with. Such a situation occurs for example in Spectral Computed Tomography (CT) imaging, in which unrealistically small dimensions of conversion layers made from usual materials would be necessary to limit counting rates to feasible ranges. By applying a primary conversion layer with a low attenuation coefficient, the counting rates can be limited with a practically feasible geometrical design.

The absolute value of the attenuation coefficient of the primary conversion layer depends on the requirements of the particular application it is intended for. In a preferred embodiment of the invention, the attenuation coefficient of the primary conversion layer ranges between 0.5 and up to about 4 times that of Si in the energy range between 20 keV and 150 keV. Most preferable, the attenuation coefficient is similar to that of Si. It should be noted that, if high-energy photons like X- or γ-rays shall be detected, the attenuation coefficient of the primary conversion layer will be strongly dependent on the atomic number Z and the mass density of said material.

A particularly suited material is silicon (Si), which can convert X-rays and γ-rays with a low stopping power into electrical signals (electron-hole pairs), with the advantages of being available at low prices and being compatible with usual semiconductor electronics. Moreover, structuring with small feature sizes is also no problem for Si, and the material is also flexible as opposed to CdTe or CZT, which are very brittle.

It may happen that X- or γ-radiation generates secondary photons in a conversion material in a process of K-fluorescence. As said photons can travel into other detector cells before being detected, this may lead to an erroneous interpretation of the spatial origin or energy of the corresponding signal. It is therefore preferred that the primary conversion layer and/or the secondary conversion layer comprise(s) a conversion material, which does not show K-fluorescence within the energy range between 20 keV and 150 keV. Alternatively or additionally, the primary conversion layer and/or the secondary conversion layer may comprise a conversion material, which has a K-fluorescence probability of only 20% or lower within said energy range between 20 keV and 150 keV. Thus undesired crosstalk effects can be minimized.

It was already mentioned that the secondary conversion layer may be of different design than the primary conversion layer. Thus the secondary conversion layer may particularly have a high attenuation coefficient or stopping power for the photons to be detected. It may therefore favorably be applied at a position where the flux of incident photons is already reduced to lower values by the primary conversion layer(s). Additionally or alternatively, the high stopping power of the secondary conversion layer may be used to capture as much of the residual photons (remaining after the passage of the primary conversion layer(s)) as possible such that no radiation is lost.

In the aforementioned case, the attenuation coefficient of the secondary conversion layer may particularly be similar to that of GaAs, CZT, CdTe, CsI, CWO, and/or GOS or higher.

The secondary conversion layer may further optionally comprise a material with a high atomic number Z and high mass density. Particular examples of suited materials comprise GaAs, CZT, CdTe, CsI, CWO, and GOS.

It was already mentioned that the particular purpose of the primary conversion layer is to limit the counting rate that has to be dealt with by the direct converting layer and the associated ERCE. In this respect it is preferable that the dimension and/or the form of the primary conversion layer is such that, for a given maximal intensity of incident photons to be detected, the counting rate seen by the direct converting layer and the ERCE remains below a given maximal counting rate, for example below about 10 Million counts per second (Mcps). It should be noted that the counting rate depends on the cross section with which the primary conversion layer is exposed to an incident beam of photons as well as on the thickness of the conversion layer with respect to the main propagation direction of said photons. Due to the low attenuation coefficient of the primary conversion layer, these dimensions can be kept above feasible limits for typical applications like spectral CT.

As to the relative arrangement of primary and secondary conversion layers, these layers might for example be disposed side-by-side with respect to the main propagation direction of the incident photons. In a preferred embodiment, the primary conversion layer and the secondary conversion layer are however stacked one behind the other in the main radiation direction. Incident photons will therefore be processed in series by the two different conversion layers.

In the aforementioned case, it is particularly preferred that the radiation detector is designed such that, during its operation, the primary conversion layer is crossed by photons prior to the secondary conversion layer (giving the terms "primary" and "secondary" a meaning in this embodiment). It should be noted in this context that photons may in principle be irradiated onto the radiation detector from any direction. However, the radiation detector will usually have additional components like shutters, anti-scatter grids, electronic circuits, housings and the like that were not explicitly mentioned as they are obvious for a person skilled in the art, wherein these components are usually arranged in such a way that it makes only sense to irradiate photons onto the detector from a particular entrance direction with respect to this detector. If the main radiation direction of the incident photons therefore coincides with said entrance direction, then the photons will first impinge onto the primary conversion layer and then (if not converted) onto the secondary conversion layer. This is usually the case if the main radiation direction is perpendicular to the layers (as shown in the appended Figures). The described sequence of impingement has the advantage that the original (high) number of photons will first see the primary conversion layer in which, due to the low attenuation coefficient, only a small fraction of the photons is affected such that the counting rates are still manageable for the associated electronics. The flux of photons that reach the secondary conversion layer will be reduced to a level at which the higher attenuation coefficient of this layer is no longer a problem (but instead an advantage) with respect to the resulting counting rates that have to be handled by the associated electronics.

In another modification of the invention, the radiation detector comprises a plurality of primary conversion layers with respective ERCEs that are stacked one behind the other along the main radiation direction. Thus each individual primary conversion layer can be kept smaller for limiting the associated counting rates of photons to manageable values.

In a further development of the aforementioned design, the different primary conversion layers have different thicknesses, preferably increasing thicknesses in the main radiation direction. Thus the sensitive volumes of the primary conversion layers can be adapted to the expected flux of photons (which diminishes continuously in the main radiation direction).

In another embodiment of the invention, the radiation detector comprises a plurality of pairs of secondary conversion layers with associated readout electronics that are stacked one behind the other in the main radiation direction. Again, such a layered design can be used to limit the counting rates that have to be coped with by each individual secondary conversion layer.

The readout electronics that is associated to the secondary conversion layer(s) can optionally be realized by an energy-resolving counting electronics (similar or identical in design to the ERCE of the primary conversion layer). Energy-resolved counting can particularly be used in combination with for example a CZT conversion layer.

In another embodiment, the readout electronics of the secondary conversion layer can be designed such that it integrates the electrical signals generated in the secondary conversion layer. This approach is particularly useful in combination with for example a GOS conversion layer, as GOS is a proven material used in known energy-integrating CT scanners. Hence, in such an embodiment the energy-resolving counting layer(s) could be made removable so that the conventional scanner based on GOS and energy-integrating readout electronics can be used with or without the energy-resolving counting layers each having their own ERCEs.

The invention further relates to an X-ray detector comprising a radiation detector of the kind described above that is sensitive to X-rays. Moreover, it relates to an imaging system comprising a radiation detector of the kind described above, wherein said imaging device may particularly be an X-ray, CT (Computed Tomography), PET (Positron Emission Tomography), SPECT (Single Photon Emission Computed Tomography) or nuclear imaging device.

The aforementioned imaging system may particularly comprise a reconstructor, for example realized by digital data processing hardware with associated software, that is coupled to the ERCE and the readout electronics for estimating energy-dependent attenuation coefficients of an object which has been crossed by the photons. Such a reconstructor may particularly be useful in an application of the radiation detector in spectral CT in order to discriminate between e.g. photo, Compton and/or K-edge coefficients of an X-rayed material.

These and other aspects of the invention will be apparent from and elucidated with reference to the embodiment(s) described hereinafter. These embodiments will be described by way of example with the help of the accompanying drawings in which:

BRIEF DESCRIPTION OF THE DRAWINGS

Like reference numbers or numbers differing by integer multiples of 100 refer in the Figures to identical or similar components.

DETAILED DESCRIPTION OF EMBODIMENTS

Figure 1:
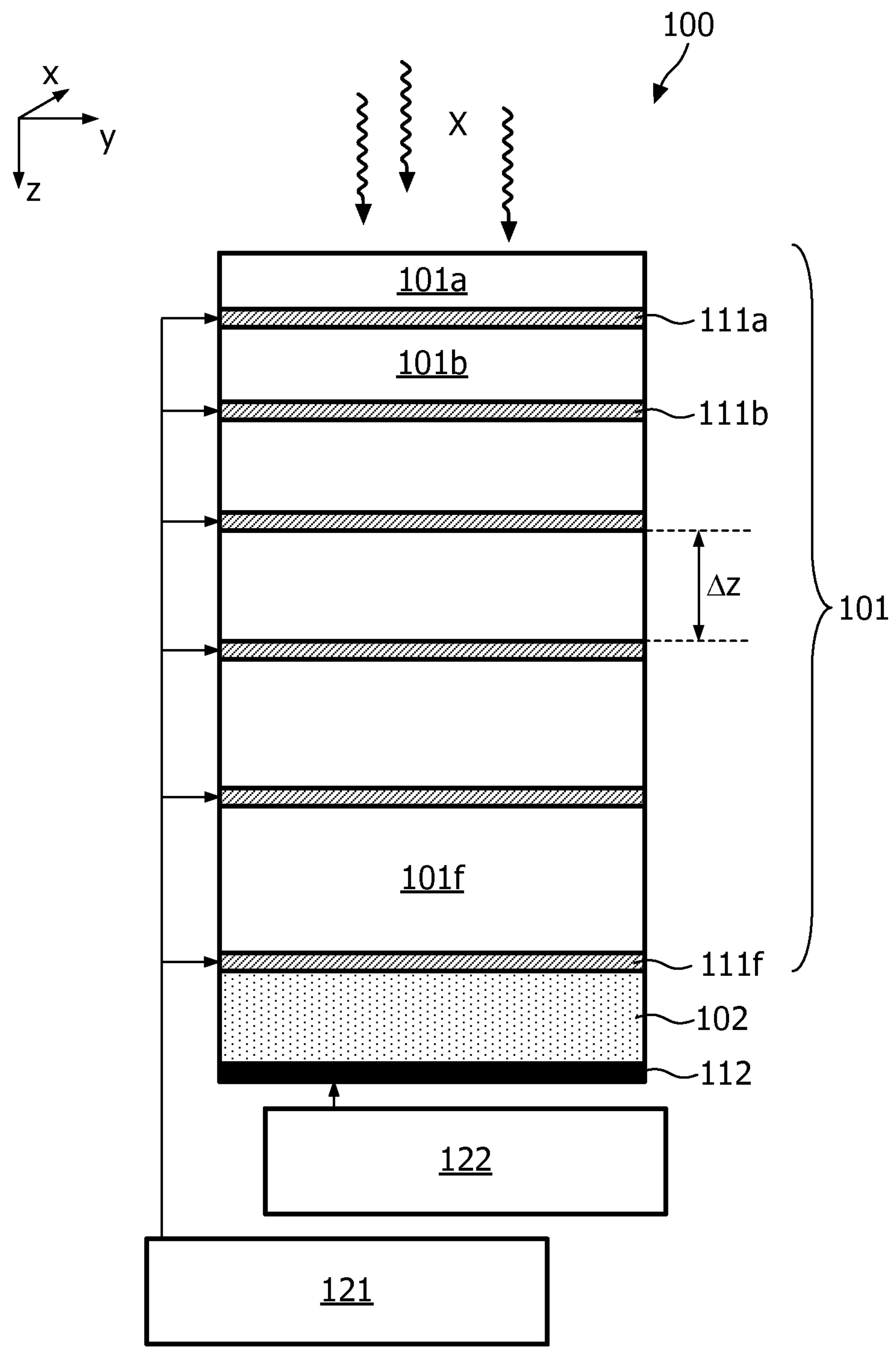
FIG. 1 shows schematically the layered structure of an X-radiation detector with a combination of Si and GOS materials.

"Spectral CT" is considered to have the potential of revolutionizing present CT systems in such a way that spectral information contained in the poly-chromatic X-ray beam generated by an X-ray tube and passing a scanned object is used to provide new and diagnostically critical information. The enabling technology for Spectral CT imaging systems is a detector which can provide a sufficiently accurate estimate of the energy spectrum of the photons hitting the detector behind the scanned object. Since for image reconstruction reasons the detector is also exposed to the direct beam, the photon count rates in a detector pixel seeing the direct beam are huge (approximately $10^9$ photons per $mm^2$ and second, i.e. 1000 Mcps per $mm^2$). Readout electronics are however expected to be able to cope with not more than 10 Mcps. To limit the counting rates, it is possible to sub-structure the sensor part of a detector (in which an X-ray photon interacts and generates a charge pulse, which is further evaluated by the readout electronics) into small sub-pixels (e.g. 300 μm×300 μm) as well as into several different sensor layers (three-dimensional sub-structuring), wherein each sub-pixel in a sensor layer has its own energy-resolving readout electronics channel with sub-channels for each energy.

As a sensor material for Spectral CT, CZT or CdTe are of interest due to their relatively high X-ray stopping power (about 3 mm thick CZT is considered sufficient to fully replace a currently used GOS scintillator). However, this high stopping power is to some extent also a disadvantage: In order to limit the maximum count rate of a sub-pixel within a sensor layer to about 10 Mcps so that the serving readout electronics channel only rarely sees pulse pile-up, the first sensor layers (of a 300 μm×300 μm pixel) would need thicknesses considerably below 100 μm. It is questionable whether so thin layers of CZT can be manufactured due to the brittleness of CZT. In addition, due to the much smaller aspect ratio (thickness/ "lateral extension"), the advantages of the small pixel effect are lost in those very thin layers below 100 μm thickness.

To address the above problems, a material with low stopping power like silicon is proposed as the sensor material for Spectral CT, possibly in conjunction with CZT or CdTe also used in counting mode, or even with an energy-integrating GOS layer. Due to the low atomic number Z=14 of Si, the X-ray attenuation is much smaller than in case of CZT or CdTe. Consequently, the layer thickness of the top layer of a stacked detector made of Si in an energy-resolving counting detector to achieve count rates not higher than 10 Mcps is in the range of 1.7 mm. The thickness of conversion layers below the top layer may even sequentially increase from layer to layer. Hence, a Spectral CT detector consisting of several layers of Si as a direct conversion material can readily be manufactured. Further advantages of Si are that it is much cheaper than CZT, much simpler to manufacture (potentially even in standard CMOS fabs), and nearly free of K-fluorescence cross-talk, since the K-edge energy is below 2 keV and the fluorescence yield (i.e. the measure for how often interactions with K-fluorescence happens) is only 4.1% (cf. e.g. L. Tlustos, Performance and limitations of high granularity single photon processing X-ray imaging detectors, Ph.D thesis, Wien Technical university, 2005, pp. 10ff).

FIG. 1 shows a particularly promising approach for a radiation detector 100 using a stack 101 of "primary conversion layers" and a "finishing" energy-integrating "secondary conversion layer" 102 which are disposed one behind the other in the main radiation direction z of incident X-rays X. The primary conversion layers are realized by a plurality of (here six) Si layers 101*a* to 101*f*, under each of which is an associated (pixellated) electrode with (at least parts of) an energy-resolving counting electronics (ERCE) 111*a* to 111*f*, respectively. Having the ERCE close to the sensor is advantageous, since the analog signals coming from the sensor are converted into digital signals without passing longer distances. All these individual ERCEs are coupled to a central, higher level electronic circuit 121 for further evaluation. It should be noted that in experimental tests with energy-resolving counting readout chips (manufactured in standard CMOS) irradiated with a high-flux X-ray beam, no spurious counts due to the direct conversion of X-rays in the CMOS chip were observed.

The secondary conversion layer 102 is realized by a GOS layer with an associated photodiode array 112 beneath it which is coupled to readout electronics 122. This design is especially attractive, since the energy-resolving counting Si layers could be used as an add-on "on top of" the energy-integrating GOS detector used in many present CT detectors.

The thickness Δz of the primary conversion layers increases from top to bottom in the main radiation direction z in order to compensate for the decreasing intensity of the remaining X-ray beam and to provide for approximately equal counting rates in all primary conversion layers. To deal with an incident X-ray flux of about $9 \cdot 10^8$ photons/($s \cdot mm^2$), conversion layers with the following thicknesses would be appropriate (i.e. keep the counting rate below 10 Mcps):

| Layer | thickness |
|---|---|
| 101a | 1.7 mm |
| 101b | 2.1 mm |
| 101c | 2.6 mm |
| 101d | 3.3 mm |
| 101e | 4.5 mm |
| 101f | 6.6 mm |
| 102 | 1.4 mm |

Figure 2:
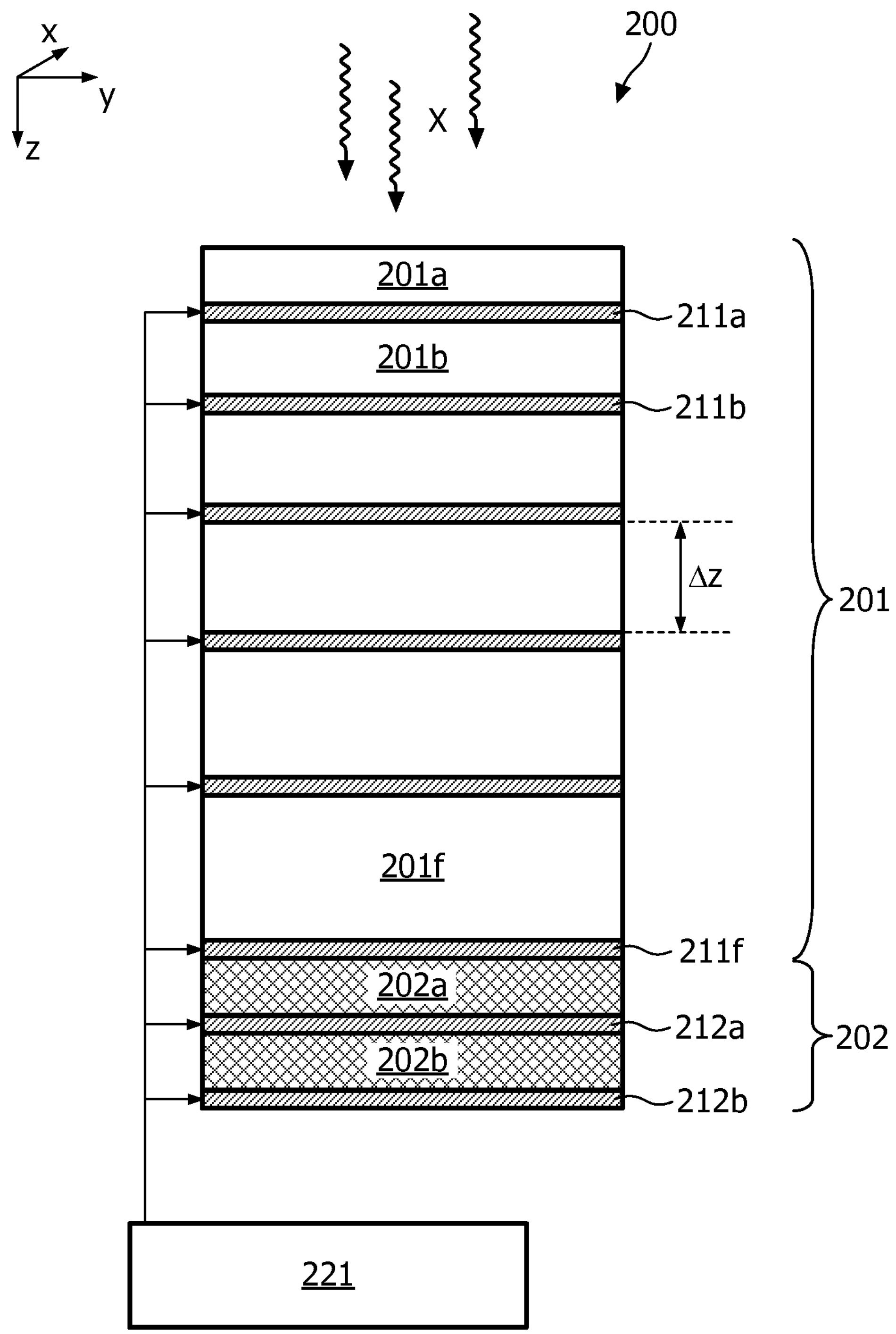
FIG. 2 shows schematically the layered structure of an X-radiation detector with a combination of Si and CZT materials.

FIG. 2 shows an alternative embodiment of an X-radiation detector 200, which is composed of a stack 201 of primary conversion layers and a stack 202 of secondary conversion layers. As above, the primary conversion layers are Si layers 201*a*-201*f* with associated electrodes and ERCE components 211*a*-211*f* beneath them which are coupled to a central evaluation circuit 221. In the main radiation direction z, the primary conversion layers are followed by several (here two) secondary conversion layers 202*a* and 202*b* of CZT with associated electrodes 212*a*, 212*b* beneath them, which are also coupled to the central evaluation circuit 221. The secondary conversion layers therefore also allow an energy-resolved counting of incident X-ray photons X, wherein they have however a higher stopping power for the reduced flux of photons that reaches them after passing the whole stack 201 of primary conversion layers.

To deal with an incident X-ray flux of about $9 \cdot 10^8$ photons/($s \cdot mm^2$), conversion layers with the following thicknesses would be appropriate (i.e. keep the counting rate below 10 Mcps):

| Layer | thickness |
|---|---|
| 201a | 1.7 mm |
| 201b | 2.1 mm |
| 201c | 2.6 mm |
| 201d | 3.3 mm |
| 201e | 4.5 mm |
| 201f | 6.6 mm |
| 202a | 0.4 mm |
| 202b | 2.6 mm |

From the point-of-view of "geometrical" cross talk it is advantageous to make the full sensor as thin as possible.

As is known from Spectral CT, decomposition of the projection data measured with the radiation detectors 100 or 200 into Photo/Compton/K-edge coefficients can be done by a standard Maximum Likelihood approach, in which for the energy-resolving counting layers a Poisson distribution model is assumed, while for the energy-integrating layer, the measurement values of which are mutually statistically independent of the measurement values in the counting layers, a Gaussian distribution is used.

While the invention was described above with respect to the main application of Computed Tomography with energy resolution, other applications may comprise projection imaging with energy resolution or any other application that may benefit from energy-resolving X-ray photon counting.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector for detecting photons propagating along a main radiation direction, comprising:

a) at least one primary conversion layer, which has a low attenuation coefficient for the photons, and an associated energy-resolving counting electronics for electrical pulses generated in the primary conversion layer upon conversion of an incident photon;

b) at least one secondary conversion layer and an associated readout electronics for electrical signals generated in the secondary conversion layer upon conversion of an incident photon, wherein a dimension and form of the at least one primary conversion layer are such that for a given maximal flux of incident photons a counting rate of the energy-resolving counting electronics is below a given maximal counting rate of 10 Mcps.

2. The radiation detector according to claim 1, wherein an attenuation coefficient of the at least one primary conversion layer ranges between about 0.5 and 4 times that of silicon for X-ray photons and/or γ-photons in the energy range between 20 keV and 150 keV.

3. The radiation detector according to claim 1, wherein the at least one primary conversion layer and/or the at least one secondary conversion layer comprises the material silicon.

4. The radiation detector according to claim 1, wherein the at least one primary conversion layer and/or the at least one secondary conversion layer comprises a conversion material, which does not show K-fluorescence within the energy range between 20 keV and 150 keV.

5. The radiation detector according to claim 1, wherein the at least one primary conversion layer and/or the at least one secondary conversion layer comprises a conversion material, which has a K-fluorescence probability of 20% or lower within the energy range between 20 keV and 150 keV.

6. The radiation detector according to claim 1. wherein the at least one secondary conversion layer has an attenuation coefficient similar to at least one of GaAs, CZT, CdTe, CsI, CWO, or GOS.

7. The radiation detector according to claim 1, wherein the at least one secondary conversion layer comprises at least one of GaAs, CZT, CdTe, CsI, CWO, or GOS.

8. The radiation detector according to claim 1, wherein the at least one primary conversion layer and the secondary conversion layer are stacked in the main radiation direction.

9. The radiation detector according to claim 1, wherein the at least one primary conversion layer is crossed by photons prior to the at least one secondary conversion layer.

10. The radiation detector according to claim 1, wherein the at least one primary conversion layer includes a plurality of primary conversion layers with associated energy-resolving counting electronics stacked in the main radiation direction.

11. The radiation detector according to claim 10, wherein the different primary conversion layers have different thickness that increase in the main radiation direction.

12. The radiation detector according to claim 1, wherein the at least one secondary conversion layer includes a plurality of secondary conversion layers with associated readout electronics stacked in the main radiation direction.

13. The radiation detector according to claim 1, wherein the readout electronics of the at least one secondary conversion layer is an energy-resolving counting electronic.

14. The radiation detector according to claim 1, wherein the readout electronics of the at least one secondary conversion layer integrates the electrical signals generated in the at least one secondary conversion layer.

15. An X-ray detector comprising a radiation detector according to claim 1.

16. An imaging system, comprising a radiation detector according to claim 1, wherein the imaging system is one of an X-ray, a CT, a PET, a SPECT or a nuclear imaging device.

17. The imaging system according to claim 16, wherein a reconstructor coupled to the energy-resolving counting electronics and the readout electronics for estimating energy-dependent attenuation coefficients of an object that has been crossed by the photons.

* * * * *